United States Patent [19]

Lerche et al.

[11] 4,345,237
[45] Aug. 17, 1982

[54] SUPERVISORY AND MONITORING SYSTEM FOR HELICOPTER PROPELLER BLADES

[75] Inventors: Ernst Lerche, Ritterhude; Bernward Raschke; Siegfried Hartwig, both of Ganderkesee, all of Fed. Rep. of Germany

[73] Assignee: Verenigte Flugtechnische Werke GmbH, Bremen, Fed. Rep. of Germany

[21] Appl. No.: 186,310

[22] Filed: Sep. 11, 1980

[30] Foreign Application Priority Data

Sep. 12, 1979 [DE] Fed. Rep. of Germany ....... 2936761

[51] Int. Cl.³ ............................................. G08B 21/00
[52] U.S. Cl. ............................... 340/27 R; 244/17.11; 416/61
[58] Field of Search ............... 340/27 R, 626; 73/802; 244/17.11, 17.13; 416/61

[56] References Cited

U.S. PATENT DOCUMENTS

| | | | |
|---|---|---|---|
| 2,936,836 | 5/1960 | Ellis | 340/27 R |
| 3,547,555 | 12/1970 | Jensen | 416/61 |
| 3,739,376 | 6/1973 | Keledy | 340/27 R |
| 3,744,300 | 7/1973 | Fleury | 416/61 |
| 3,744,928 | 7/1973 | Hansen et al. | 416/61 |
| 3,981,611 | 9/1976 | Jensen | 416/61 |
| 3,985,318 | 10/1976 | Dominey et al. | 340/27 R |
| 4,026,660 | 5/1977 | Ueda et al. | 416/61 |
| 4,106,332 | 8/1978 | McEeown | 340/27 R |
| 4,275,376 | 6/1981 | Alexander et al. | 340/27 R |

FOREIGN PATENT DOCUMENTS

1616431  6/1972  Fed. Rep. of Germany .

*Primary Examiner*—Gerald L. Brigance
*Attorney, Agent, or Firm*—Ralf H. Siegemund

[57] ABSTRACT

The blades of a helicopter propeller are supervised by pressure-sensitive transducers operating a resonance circuit rotating therewith, for determining its frequency. The circuit includes a rotating secondary of a transformer, intermittently coupled to a stationary primary which is energized by a voltage having a frequency equal to the resonance frequency of the resonance circuit when there is no blade defect. An impedance senses the amplitude of these pulses which varies on detuning due to a blade defect. The pulses are processed to yield a warning. Scanning through a range of source frequencies permits identification of the defective blade. The circuit is supplemented for operational testing during flight as well as on the ground.

14 Claims, 3 Drawing Figures

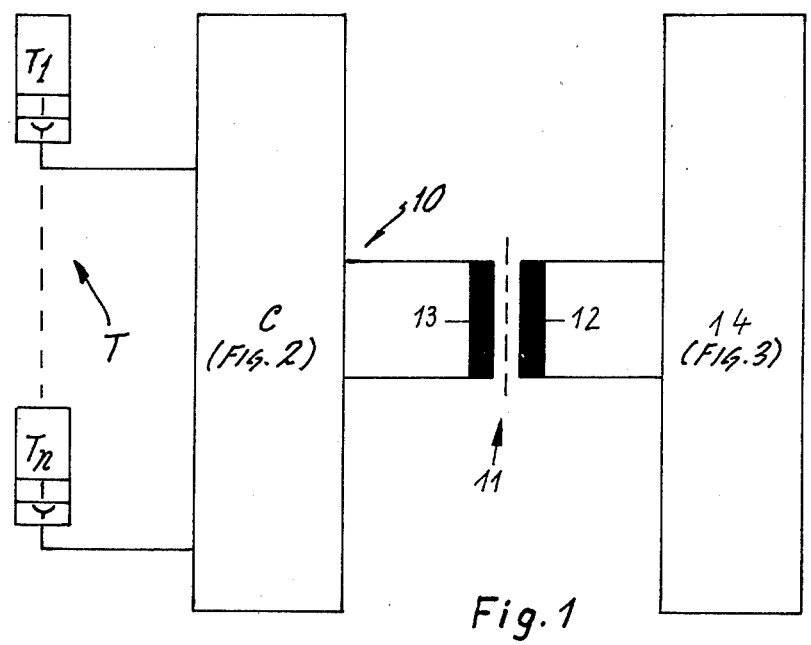
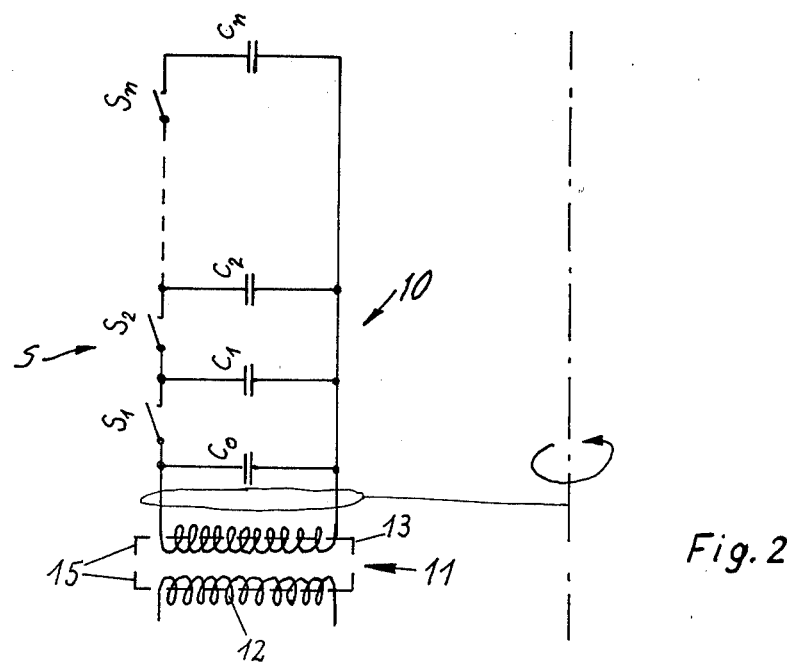
Fig. 1
Fig. 2

SUPERVISORY AND MONITORING SYSTEM FOR HELICOPTER PROPELLER BLADES

BACKGROUND OF THE INVENTION

The present invention relates to the supervision of structure elements such as rotor blades; and more particularly, the invention relates to monitoring the gas pressure on such blades, pertaining, e.g., to a helicopter.

The structural integrity of the rotor blades of, e.g., a helicopter is of vital importance for the safety of such aircraft; therefore, they have to be monitored and supervised during flight. The supervision uses a pressure transducer on a blade (one per blade), an inductive transmission path from rotating to stationary parts of the equipment and from there, e.g., to the cockpit, or the like, to trigger a warning lamp in case of any undue pressure drop. Unfortunately, such a monitoring system is necessary because the rotor blades may not be sufficiently reliable, even when checked prior to takeoff.

A major problem within the system outlined above is caused by the transmission of the measuring signals from rotating to stationary parts. Slip rings, collector rings, or the like, are not sufficiently reliable due to strong vibrations to which the aircraft is subjected. Another approach involves the utilization of radioactive elements which are shielded as long as the rotor remains without defect, while defects are used to offset some of the shielding. This approach is objectionable for a number of reasons, such as health and outside interference in the case of military aircraft.

Another approach is the use of a rotational transformer. The primary winding rotates with the propellor, the secondary winding is stationary, and the windings are constructed in such a manner that signals can be transmitted during and in spite of the rotation. Concerning the inductive transmission of signals between a stationary and a rotating member, see, for example, German patent 1,616,431. Unfortunately, the rotor construction in a helicopter, including particularly the bearings, and so forth, does not permit the inclusion of such a transformer; there just is not enough space available. One would have to change the entire propeller construction as to its bearings, and related parts, which creates too much of a problem.

DESCRIPTION OF THE INVENTION

It is an object of the present invention to provide a new and improved monitoring and supervisory system for rotor blades, or the like.

It is a particular object of the present invention to provide such a system in a manner which avoids the signal transmission problem outlined above.

In accordance with the preferred embodiment of the present invention, it is suggested to provide a resonance circuit on the rotor, operated by switches which, in turn, are operated individually by rotor-blade-monitoring transducers. The resonance circuit constitutes a load on a transformer secondary, also rotating with the rotor. A stationary, off-axis primary winding is intermittently coupled to the secondary during rotor rotation. The transformer is, thus, eccentrically disposed to the rotor axis wherever it is convenient and does not interfere with the bearings. The primary is connected to a source of a-c signals via a sensing circuit (impedance) which signals whether the resonance circuit is tuned to or detuned from the a-c frequency. Detuning results, e.g., from response of one of the switches to a defective blade. The sensing circuit, preferably, is a circuit which responds to the amplitude of pulses, each pulse being produced when the transformer windings are coupled to each other. Amplitude discrimination of the pulses permits detection of a fault condition. The resonance circuit is designed in such a way that a response of a particular blade transducer results in a particular resonance frequency other than the one present when any one of the blades is not defective, and different for each different blade when defective. Detection of that frequency by scanning through the range (by means of frequency-variable a-c signals at the primary side) permits identification of the defective blade.

The inventive method and system have the advantage that structural changes in the rotor head and the bearings of the propeller shaft are not needed. The transformer windings can be fairly simply attached, clearly off the axis Also, the portion of the system on the rotor is a passive one; it does not require a power supply if the transducers are directly operated by gas pressure.

The circuit can be supplemented by test and diagnostic circuitry to check operativeness at will, even during flight. Another supplemental circuit permits checking of the operational state even when the propeller is not running.

DESCRIPTION OF THE DRAWINGS

While the specification concludes with claims, particularly pointing out and distinctly claiming the subject matter which is regarded as the invention, it is believed that the invention, the objects and features of the invention, and further objects, features, and advantages thereof, will be better understood from the following description taken in connection with the accompanying drawings, in which:

FIG. 1 is a system diagram for practicing the preferred embodiment of the present invention in accordance with the best mode thereof;

FIG. 2 is a circuit diagram of the passive portion of the system as connected to the rotor of the propeller.

Proceeding now to the detailed description of the drawings, FIG. 1 illustrates a plurality of pressure-sensitive transducers $T_1$ through $T_n$ which operate respectively switches $S_1$ through $S_n$ (FIG. 2) for disconnecting individual capacitors $C_1$ through $C_n$ of a capacitor bank C pertaining to a resonance circuit 10. These capacitors are, or can be, connected in parallel to the secondary winding 13 of a rotational transformer 11. The capacitors of bank C and this secondary winding 13 establish the parallel resonance circuit 10.

Figure 3:
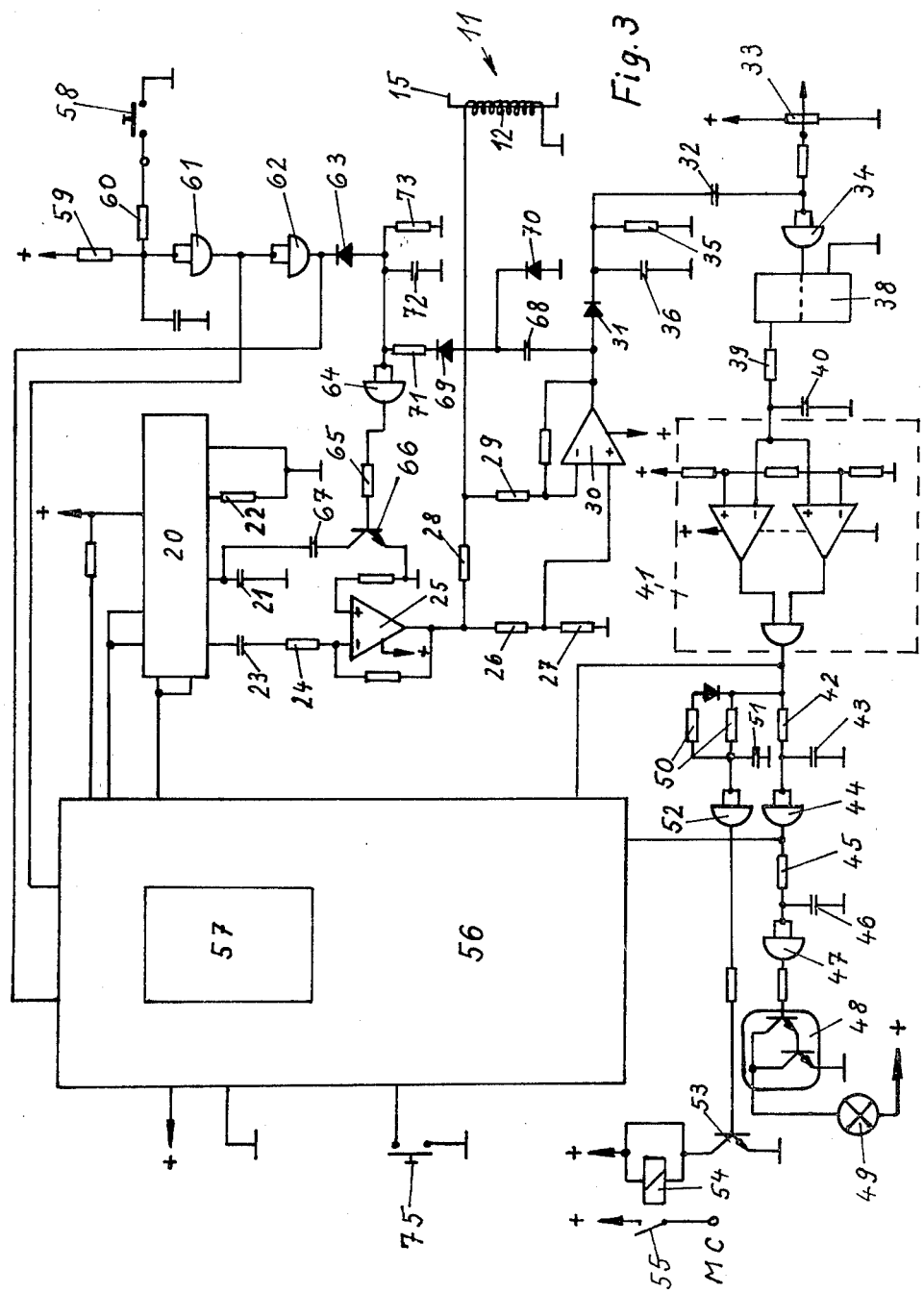
FIG. 3 is a circuit diagram of the active portion of the system generating the test signals, providing warning and including circuitry for testing the circuit.

The rotational transformer has a primary winding 12 which is connected to a function and signal generator contained in a stage 14, explained in detail with reference to FIG. 3. Stage 14 combines further a searching circuit, a warning circuit, and trigger and self-testing circuitry of the system.

FIG. 2 illustrates further the axis of rotation demonstrating that the transformer windings are off axis and, therefore, only intermittently coupled to each other. They have, however, the same distance from that axis. The transformer is, thus, effective like a pulse transformer because the period of coupling covers only a fraction of a rotational period. Two halves of a core 15 provide adequate shielding as well as coupling enhancement.

Secondary winding 13 is permanently connected to a capacitor $C_o$, while the other junctions are under control of the switches $S_1$ to $S_n$. These switches connect these other electrodes serially to each other and to the other junction between $C_o$ and coil 13.

All switches $S_1$ to $S_n$ are closed as long as all of the rotor blades are without defect. In the case of a crack in one of the blades, the respective transducer T operates its switch, i.e., the switch opens because the respective transducer senses a pressure drop. The disconnection of capacitors is carried out in the form of a hierarchy; just one capacitor, $C_n$, is disconnected when $S_n$ opens. All of the capacitors (excepting, of course, capacitor $C_o$) are disconnected when $T_1$ operates $S_1$. Further details of the control requires reference to FIG. 3. However, one can readily see that, for each open switch, a unique state is established in that the remaining capacitors (or just one) complete a unique resonance circuit. Thus, with all switches closed, tank circuit 10 has a particular resonance frequency; response of a particular transducer and switch establishes a different, unique resonance frequency so that a defective rotor blade can be identified through the then existing resonance frequency. Let transducer $T_i$ be the responding transducer: then, the tank circuit will be made up by capacitors $C_o, C_1, \ldots, C_{i-1}, C_i$.

The system shown in FIG. 3 includes a function or signal generator 20 which is comprised of an integrated circuit, supplemented by external circuitry which includes discrete elements such as a capacitor 21 and a resistor 22 to complete an R-C generator. Operating voltage is also supplied to this generator. The output of generator 20 is an a-c voltage having a frequency that is accurately determined by the R-C circuit components 21 and 22, having a frequency equal to the frequency established by the tank circuit 10. Thus, the generator provides an a-c voltage whose frequency is equal to the resonance frequency of circuits 13 and capacitors $C_o$ to $C_n$ for defectless rotor blades.

The output signal of function and signal generator 20 is fed to the inverting input of a power amplifier 25 being constructed as a differential amplifier. The noninverting input of amplifier 25 is resistively connected to ground. A gain-determining resistor interconnects the output of amplifier 25 with the inverting input. The signal generated by source 20 is applied to the inverting input via a capacitor 23 and a resistor 24.

The output of differential amplifier 25 is connected to ground (i) via a high-ohmic voltage divider 26,27 and (ii) via the primary winding 12 of transformer 11, in series with a low-ohmic resistor 28 acting as current-sensing element or impedance. Thus, a voltage drop is produced across resistor 28, which is very small when the primary and secondary windings of transformer 11 are coupled and there is no defect in the blades. The reason for this resides in the fact that the resonance circuit 10 acts as high-ohmic impedance and, thus, constitutes a small load during the coupling phase, as compared with the situation of transformer winding decoupling. Also, when the resonance circuit 10 is "detuned" due to response by one or more of the switches S, the load conditions change in the coupling phase which is noticeable as a change in the voltage drop across resistor 28 and that change can be used to trigger the warning. A resonance circuit 10 whose resonance frequency differs from the supply frequency offers load conditions which, when reflected to the primary circuit, resemble the decoupling phase.

The voltage drop across resistor 28 is detected by means of a differential amplifier 30 whose inverting input is connected to resistor 28 via a resistor 29 and whose noninverting input is connected to the junction between resistors 26 and 27. The output of the differential amplifier 30 represents the voltage drop across resistor 28 and is passed through a rectifying diode 31 and a coupling capacitor 32 to a threshold switch 34. The threshold and response level of that switch is adjustable by an adjustable resistor 33. The cathode of diode 31 is referenced to ground via a parallel circuit of a resistor 35 and a capacitor 36.

As the propeller runs, an a-c voltage develops across resistor 28 whose amplitude changes in pulse-type fashion whenever the primary and secondary windings of transformer 11 are coupled. That voltage is amplified in amplifier 30, rectified by diode 31, and filtered by resistor 35 and capacitor 36. The resulting pulse sequence operates the threshold switch 34 which produces a sequence of "squared" pulses. One of the functions of threshold device 34 is noise rejection.

The output of switch 34 is a series of pulses which (i) occur at a regular rate for constant rotor speed; (ii) do occur at such a rate, or any other rate, provided the amplitude is sufficiently high in order to exceed the adjusted threshold. The output pulses are fed to a 2:1 pulse divider 38 (toggle flip-flop) which produces a rectangular, symmetrical output if the rotor head provides constant turns. The output pulses of 38 vary between two levels, +UV and OV, and these pulses are fed to an integrator being comprised of a series resistor 39 and a parallel capacitor 40. The integrator feeds its integrated output to a window discriminator 41 which determines the steady-state level, and particularly whether the integration output is between $\pm\frac{1}{2}$ UV of a particular level. Window discriminator 41 responds whenever the integration output is outside that window. In particular, the window generator 41 establishes two spaced apart response levels being defined by different bias levels for two oppositely effective inputs in the two differential amplifiers; whenever the integrator tends to run up, one of them will respond, producing the same output that the other one will produce when the integrator tends to run down. Either situation can occur when, following a pulse (28 to 31 to 34 to 38), the next one is missing leaving flip-flop 38 in one or the other state. The circuit is actually more sensitive than to just a complete interruption of sensing pulses. Irregularly occuring pulses may also cause the integration output to traverse one or the other window level.

The output of device 41, produced in response to a pulse irregularity, is fed to another threshold switch 44 via a delay comprised of resistor 42 and a capacitor 43; the output of threshold switch 44 is further delayed by resistor 45 and capacitor 46 in order to feed another threshold switch 47 which, in turn, operates a driver stage 48 for driving a warning lamp 49.

The switching signal for the warning lamp as originating in window discriminator 41 is additionally fed to a ten-second (approximately) delay circuit 50,51 and a threshold switch 52 to drive a transistor 53 which, in turn, drives a relay 54. This relay responds also when the output of integrator 39,40 is outside the window and operates a contact for a "master caution" indicator in a central, fault-indicating and display field.

It will be appreciated that lamp 49 is turned on when one or several motor blades experience a pressure drop, e.g. on account of a defect, so that the pilot may attempt to land as fast as possible. The altered conditions of resonance in circuit 10 produce a rise in current flow through resistor 28 so that the rectified pulses are, possibly, irregular, causing the integrator to run up or down, so that its output level is above or below the window levels; either condition triggers the warning.

This disconnection of but one capacitor suffices to trigger a warning. In other words, for a warning itself, just one and the same capacitor (e.g., $C_1$) would suffice to be turned off to detune the resonance circuit from the supply frequencies. However, as stated, the circuit layout permits also an identification of the faulty blade. For this purpose, a search circuit 56 is triggered by the output of discriminator 41 as well as by the output of threshold switch 44.

The search circuit 56 is a control circuit which operates an input for generator 20 toward changing the output frequency, covering and scanning through a range of resonance frequencies, from the normal value (all switches $S_1$ to $S_n$ closed) to the value present when switch $S_1$ is open and only one capacitor $C_o$ is in the circuit. A different resonance frequency in that range exists when any one of the other switches is open. Thus, as the function generator scans through that range, a particular frequency will hit resonance conditions, and the current decreases in resistor 28 and pulses are again produced. Each detected resonance frequency can be associated with switches $S_1$ through $S_n$ so that the faulty rotor blade is identified therewith.

Panel 57 schematically represents an indication and display in which frequency, produced in conjunction with generator 20, is actually indicated (calibrated) by a rotor blade identification. After the range has been scanned through, generator 20 furnishes again the frequency representing a fault-free rotor; but since one blade is defective, warning lamp 49 will go on again. A push-button 75 may be provided to cancel the indication in panel 57. Should the defect be a temporary one, the gas pressure at the particular blade may increase again, which results in a turning-off of lamp 49. Please note that indication in Panel 57 persists until cancelled manually (switch 75).

The rather unlikely event of two blades becoming defective simultaneously results in two open switches S, but only one can be identified by the search method described above, namely the one closer to $S_1$. However, the second fault can later be detected and ascertained.

The system, as described earlier, permits also a self-checking operation. Such a check is initiated by pressing switch 58 which turns on a voltage divider 59,60, operating a threshold switch 61 which, in turn, operates a threshold switch 62. Response of switch 61 is also used to block, i.e. disable, temporarily search circuit 56 for this operation. The output of threshold switch 62 bypasses the search circuit 56 and activates the indicator 57. The output of circuit 62 is fed to a third threshold circuit 64 via a diode 63. Switch 64 operates a switching transistor 66 via a resistor 65. The collector-emitter path of that transistor operates to connect a capacitor 67 parallel to the capacitor 21 of the function generator.

It will be recalled that the latter capacitor is one of the principal elements to determine the output frequency of signal generator and source 10. Upon connecting capacitor 67 in parallel, the generator frequency is shifted to a value outside the range of the tank circuit 10. Thus, resistor 28 will now signal a defect, as described, irrespective of the state of the switches S. If, indeed, resistor 28 is able to sense this simulated defect and if the elements up to lamp 49 respond to indicate a "defect," the circuit is operational. Upon release of switch 58, the normal operational state is restored. Failure of lamp 49 to respond to a pressing of switch 58 is an indication that the monitoring system as such is, indeed, defective. This test can be carried out at any time, including in-flight operation.

Additional equipment is provided for the conduction of a function test on ground, when the rotor does not rotate. In this case, it is, of course, required, to shift the propeller into a position in which primary and secondary windings of the transformer 11 are coupled to each other. As a consequence, pulses are not produced across the resistor 28 so that the integrator 39,40 is either up or down, and there will be a warning, even if the rotor blades are perfectly in order. The following auxiliary circuit is, therefore, used to simulate rotation of the rotor.

A capacitor 68 is connected to the output of differential amplifier 30 and, in conjunction with the two diodes 69 and 70, the output voltage of amplifier 30 is doubled. A high-ohmic resistance 71 applies this voltage to the threshold switch 64 whose input junction with diode 63 is additionally coupled to ground via a capacitor 72 and a high-ohmic resistor 73. Charging of capacitor 72 delays the response of threshold switch 64 and disconnects capacitor 67 via transistor 66. The generator, thus, provides again the frequency of the completed tank circuit 10. In the case of resonance (no defect), the voltage across resistor 28 changes again; so does the output of differential amplifier 30. Depending upon the delay of R-C circuit 72,73, the signal level charge on amplifier 30 is delayed and effective at switch 64, and capacitor 67 is then reconnected in parallel to capacitor 21. Thus, the frequency of the signal generator is again shifted to a no-resonance or off-turn condition. The amplifier 30, therefore, produces an output voltage and, after a delay, capacitor 67 is again disconnected, and so forth.

It can, thus, be seen that the output of amplifier 30 oscillates, i.e., assumes a pulse shape, as the signal generator produces a frequency determined by capacitor 21 alone and another frequency resulting from the parallel connection of capacitors 21 and 67. For coupled transformers, one instance finds resonance (if the blades are without defect!), while there is no resonance by circuit 10 for the detuned signal generator frequency. The pulse rate is determined by R-C circuit 72,73 and is preferably equal or similar to the normal rotor blade rotation. Thus, pulses are produced and lamp 49 will not turn on.

If the transformer is decoupled (off position of the stationary rotor) or if one or several blades are defective, pulses will not be produced and the warning light 49 goes on. The lamp will go out when the rotor is shifted to a transformer-coupling position, provided there is no defective blade. If the light stays on, then the circuit found a defect in one of the blades.

It can readily be seen that the inventive principle is applicable not only to rotor blades of helicopters, but any kind of rotor blades, or other components under pressure, can be monitored as to their structural integrity.

The invention is not limited to the embodiments described above; but all changes and modifications thereof, not constituting departures from the spirit and scope of the invention, are intended to be included.

We claim:

1. A system for monitoring rotor blades of a propeller wherein each rotor blade is associated with a sensitive transducer responding to a defect of the blade, there being a plurality of transducers accordingly, comprising:
    a resonance circuit provided for rotating with the rotor and including a plurality of capacitors;
    a plurality of switches respectively operated by said transducers of the plurality and connected to the capacitors of the plurality of capacitors for individually altering the resonance frequency of the resonance circuit so that a different resonance frequency exists for responses of different ones of the transducers and the respective resonance frequency is representative of the rotor blade being defective;
    a pulse transformer having a primary being stationary relative to the rotor, and a single secondary rotating with the rotor, excentrically thereto, and being intermittently coupled to the primary pursuant to rotor rotation, the resonance circuit being connected to the single secondary winding as a load thereon;
    a signal generator connected for feeding a signal to the primary;
    circuit means including impedance means connected to the signal generator to respond to a change in the load upon response of at least one of said switches; and
    indicating means connected to said impedance means to indicate such a change as an indication of a defect in at least one of the rotor blades.

2. A system as in claim 1, the signal generator providing a voltage having a frequency equal to the resonance frequency of the resonance circuit with all blades showing no defect.

3. A system as in claim 1 or 2, the circuit means providing a series of pulses indicative of the rotation of the rotor and responding to the amplitude of the pulses, being dependent upon resonance state of the resonance circuit.

4. A system as in claim 1, including means for scanning a frequency range of voltages as applied to the primary to search for the existing resonance frequency in the resonance circuit.

5. A system for monitoring rotor blades of a propeller wherein each rotor blade is associated with a sensitive transducer responding to a defect of the blade, there being a plurality of transducers accordingly, comprising:
    a resonance circuit provided for rotating with the rotor and including a plurality of capacitors;
    a plurality of switches respectively operated by said transducers of the plurality and connected to the capacitors of the plurality of capacitors for individually altering the resonance frequency of the resonance circuit so that a different resonance frequency exists for responses of different ones of the transducers and the respective resonance frequency is representative of the rotor blade being defective;
    a pulse transformer having a primary being stationary relative to the rotor, and a single secondary rotating with the rotor, excentrically thereto, and being intermittently coupled to the primary pursuant to rotor rotation, the resonance circuit being connected to the single secondary winding as a load thereon;
    a source of a-c signals;
    circuit means including an impedance means for connecting the source to the primary winding to feed thereto the a-c signals to be effective in the resonance circuit, there being a pulse sequence generated across the impedance means pursuant to intermittent coupling of primary and secondary windings to each other during rotation of the rotor;
    threshold means connected to be responsive to the amplitude of the pulses of the sequence;
    circuit means connected to the threshold means and responsive to absence, presence, and irregular occurrences of pulses of the sequence having an amplitude indicative of a state of the resonance circuit for defectless blades; and
    indicating means connected to the circuit means to be responsive to said absence or irregular occurrence to provide a warning.

6. A system as in claim 5, the circuit means including a pulse generator, an integrator connected to the pulse generator, a discriminator responsive to integration output above a first level or below a second level to operate said indicating means.

7. A system as in claim 6, the circuit means including further threshold means, delay means, a driven stage, and a lamp serially connected in that sequence.

8. A system as in claim 1 or 5, including a local, oscillating circuit operating the signal generator to periodically alter the output frequency thereof for the purpose of simulating a pulse sequence to be effective when there is no rotation, to test operativeness of the circuit.

9. A system as in claim 8, the oscillating circuit being a feedback-type circuit connecting and disconnecting a capacitor respectively to and from said source.

10. A system as in claim 1 or 5, including a test switch connected for detuning the generator in simulation of a defective blade having operated the switch means.

11. A supervisory system for rotating elements, comprising:
    a transformer whose secondary rotates relative to its primary;
    a resonance circuit connected to the secondary;
    transducer means operated in response to defect conditions in the elements to change resonance frequency of the resonance circuit;
    a source of a-c signals connected to said primary;
    sensing means connected to monitor load conditions on the transformer and providing a pulse indicative thereof whenever the primary and the secondary are coupled during said rotation;
    threshold means responsive to the pulses when exceeding a particular amplitude;
    integrating means responsive to pulses resulting from outputs of the threshold means;
    a window discriminator connected to respond when the integrating means produces an output above or below a level range; and
    indicating and warning means connected to be responsive to said output.

12. A system as in claim 11, the resonance circuit including a plurality of capacitors having an electrode each connected to each other while a plurality of switch means connect the respective other electrodes, the transducing means operating said switches so that for each open switch the resonance circuit has a different resonance frequency; and
 means for changing the frequency of the source to search for identity of the defective element.

13. A system as in claim 11, the threshold means providing pulses operating a toggle flip-flop, the output of said flip-flop being connected to the integrating means for integrating same.

14. A system as in claim 1, 5, or 11, including a test switch for detuning the signal generator to simulate a fault condition of the blades or elements for purposes of testing operativeness of the circuit.

* * * * *